United States Patent
Pearson et al.

(10) Patent No.: US 8,219,496 B2
(45) Date of Patent: Jul. 10, 2012

(54) METHOD OF AND APPARATUS FOR ASCERTAINING THE STATUS OF A DATA PROCESSING ENVIRONMENT

(75) Inventors: Siani Lynne Pearson, Bristol (GB); Graeme John Proudler, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 3125 days.

(21) Appl. No.: 10/080,479

(22) Filed: Feb. 22, 2002

(65) Prior Publication Data

US 2002/0120575 A1   Aug. 29, 2002

(30) Foreign Application Priority Data

Feb. 23, 2001   (GB) .................................. 0104673.9

(51) Int. Cl.
*G06F 9/46* (2006.01)
*G06F 9/445* (2006.01)

(52) U.S. Cl. .................................. 705/67; 713/2; 726/17
(58) Field of Classification Search .................... 705/26; 713/153, 172, 168
See application file for complete search history.

(56) References Cited

U.S. PATENT DOCUMENTS

| | | | |
|---|---|---|---|
| 4,747,040 A | 5/1988 | Blanset et al. | |
| 4,799,156 A | 1/1989 | Shavit et al. | |
| 4,926,476 A | 5/1990 | Covey | |
| 4,933,969 A | 6/1990 | Marshall et al. | |
| 4,962,533 A | 10/1990 | Kruger et al. | |
| 4,984,272 A | 1/1991 | McIlroy et al. | |
| 5,029,206 A | 7/1991 | Marino et al. | |
| 5,032,979 A | 7/1991 | Hecht et al. ................... 364/200 |
| 5,038,281 A | 8/1991 | Peters | |
| 5,136,711 A | 8/1992 | Hugard et al. | |
| 5,144,660 A | 9/1992 | Rose ................................ 380/4 |
| 5,261,104 A | 11/1993 | Bertram et al. | |
| 5,278,973 A | 1/1994 | O'Brien et al. | |
| 5,283,828 A | 2/1994 | Saunders et al. | |
| 5,325,529 A | 6/1994 | Brown et al. | |
| 5,341,422 A | 8/1994 | Blackledge et al. | |
| 5,359,659 A | 10/1994 | Rosenthal ......................... 380/4 |
| 5,361,359 A | 11/1994 | Tajalli et al. .................. 395/700 |
| 5,379,342 A | 1/1995 | Arnold et al. | |

(Continued)

FOREIGN PATENT DOCUMENTS

CA   2187855   6/1997

(Continued)

OTHER PUBLICATIONS

"System for Detecting Undesired Alteration of Software," *IBM Technical Disclosure Bulletin*, vol. 32, No. 11, pp. 48-50 (Apr. 1990).

(Continued)

*Primary Examiner* — Evens J Augustin

(57) ABSTRACT

In order to facilitate a user's ability to trust a computing environment, a trusted computing device (2) is arranged to challenge other devices in the computing environment and to record a log of the facilities available within the computing environment and an indication of whether those facilities are trustworthy. A new user (40) entering the computing environment can obtain the log from the trusted computing device in order to ascertain the status of the environment. Alternatively any device can hold data concerning platforms in its vicinity and its operation can be authenticated by the trusted device.

7 Claims, 5 Drawing Sheets

U.S. PATENT DOCUMENTS

| | | | |
|---|---|---|---|
| 5,404,532 A | 4/1995 | Allen et al. | 395/700 |
| 5,410,707 A | 4/1995 | Bell | |
| 5,414,860 A | 5/1995 | Canova et al. | |
| 5,421,006 A | 5/1995 | Jablon et al. | 395/575 |
| 5,440,723 A | 8/1995 | Arnold et al. | 395/181 |
| 5,444,850 A | 8/1995 | Chang | |
| 5,448,045 A | 9/1995 | Clark | |
| 5,454,110 A | 9/1995 | Kannan et al. | |
| 5,473,692 A | 12/1995 | Davis | |
| 5,483,649 A | 1/1996 | Kuznetsov et al. | |
| 5,491,750 A * | 2/1996 | Bellare et al. | 713/155 |
| 5,495,569 A | 2/1996 | Kotzur | |
| 5,497,490 A | 3/1996 | Harada et al. | |
| 5,497,494 A | 3/1996 | Combs et al. | |
| 5,504,814 A | 4/1996 | Miyahara | |
| 5,504,910 A | 4/1996 | Wisor et al. | |
| 5,511,184 A | 4/1996 | Lin | |
| 5,530,758 A | 6/1996 | Marino et al. | |
| 5,535,411 A | 7/1996 | Speed et al. | |
| 5,548,763 A | 8/1996 | Combs et al. | |
| 5,555,373 A | 9/1996 | Dayan et al. | |
| 5,572,590 A | 11/1996 | Chess | 380/4 |
| 5,619,571 A | 4/1997 | Sandstrom et al. | 380/4 |
| 5,680,452 A | 10/1997 | Shanton | |
| 5,680,547 A | 10/1997 | Chang | |
| 5,692,124 A | 11/1997 | Holden et al. | |
| 5,694,590 A | 12/1997 | Thuraisingham et al. | |
| 5,701,343 A | 12/1997 | Takashima et al. | |
| 5,706,431 A | 1/1998 | Otto | |
| 5,768,382 A | 6/1998 | Schneier et al. | |
| 5,771,354 A | 6/1998 | Crawford | |
| 5,774,717 A | 6/1998 | Porcaro | |
| 5,787,175 A | 7/1998 | Carter | |
| 5,809,145 A | 9/1998 | Slik et al. | 380/25 |
| 5,815,665 A | 9/1998 | Teper et al. | |
| 5,815,702 A | 9/1998 | Kannan et al. | |
| 5,819,261 A | 10/1998 | Takahashi et al. | |
| 5,841,868 A | 11/1998 | Helbig | |
| 5,841,869 A | 11/1998 | Merkling et al. | |
| 5,844,986 A | 12/1998 | Davis | 380/4 |
| 5,845,068 A | 12/1998 | Winiger | |
| 5,867,646 A | 2/1999 | Benson et al. | |
| 5,887,163 A | 3/1999 | Nguyen et al. | |
| 5,889,989 A | 3/1999 | Robertazzi et al. | |
| 5,890,142 A | 3/1999 | Tanimura et al. | |
| 5,892,900 A | 4/1999 | Ginter et al. | 726/26 |
| 5,892,902 A | 4/1999 | Clark | |
| 5,903,732 A | 5/1999 | Reed et al. | |
| 5,917,360 A | 6/1999 | Yasutake | |
| 5,922,074 A | 7/1999 | Richard et al. | |
| 5,933,498 A | 8/1999 | Schneck et al. | |
| 5,937,066 A | 8/1999 | Gennaro et al. | |
| 5,937,159 A | 8/1999 | Meyers | |
| 5,940,513 A | 8/1999 | Aucsmith et al. | |
| 5,958,016 A | 9/1999 | Chang et al. | 709/229 |
| 5,960,177 A | 9/1999 | Tanno | |
| 5,966,732 A | 10/1999 | Assaf | |
| 5,987,605 A | 11/1999 | Hill et al. | |
| 5,987,608 A | 11/1999 | Roskind | |
| 6,006,332 A | 12/1999 | Rabne et al. | |
| 6,012,080 A | 1/2000 | Ozden et al. | |
| 6,021,510 A | 2/2000 | Nachenberg | |
| 6,023,765 A | 2/2000 | Kuhn | |
| 6,038,667 A | 3/2000 | Helbig | |
| 6,067,559 A | 5/2000 | Allard et al. | |
| 6,078,948 A | 6/2000 | Podgorny et al. | |
| 6,079,016 A | 6/2000 | Park | |
| 6,081,830 A | 6/2000 | Schindler | |
| 6,081,894 A | 6/2000 | Mann | 713/188 |
| 6,091,956 A | 7/2000 | Hollenberg | |
| 6,098,133 A | 8/2000 | Summers et al. | |
| 6,100,738 A | 8/2000 | Illegems | |
| 6,115,819 A | 9/2000 | Anderson | |
| 6,125,114 A | 9/2000 | Blanc et al. | |
| 6,138,239 A | 10/2000 | Veil | |
| 6,148,342 A | 11/2000 | Ho | |
| 6,154,838 A | 11/2000 | Le et al. | |
| 6,157,719 A | 12/2000 | Wasilewski et al. | |
| 6,175,917 B1 | 1/2001 | Arrow et al. | |
| 6,185,678 B1 | 2/2001 | Arbaugh et al. | |
| 6,203,101 B1 | 3/2001 | Chou et al. | 701/207 |
| 6,211,583 B1 | 4/2001 | Humphreys | |
| 6,253,193 B1 | 6/2001 | Ginter et al. | |
| 6,253,324 B1 | 6/2001 | Field et al. | |
| 6,253,349 B1 | 6/2001 | Maeda et al. | |
| 6,266,774 B1 | 7/2001 | Sampath et al. | |
| 6,272,631 B1 | 8/2001 | Thomlinson et al. | |
| 6,275,848 B1 | 8/2001 | Arnold | |
| 6,289,462 B1 | 9/2001 | McNabb et al. | |
| 6,292,900 B1 | 9/2001 | Ngo et al. | |
| 6,304,970 B1 | 10/2001 | Bizzaro et al. | |
| 6,327,533 B1 | 12/2001 | Chou | 701/207 |
| 6,327,579 B1 | 12/2001 | Crawford | |
| 6,327,652 B1 * | 12/2001 | England et al. | 713/2 |
| 6,330,669 B1 | 12/2001 | McKeeth | |
| 6,330,670 B1 | 12/2001 | England et al. | 713/2 |
| 6,334,118 B1 | 12/2001 | Benson | |
| 6,367,012 B1 | 4/2002 | Atkinson et al. | |
| 6,374,250 B2 | 4/2002 | Ajtai et al. | |
| 6,389,536 B1 * | 5/2002 | Nakatsuyama | 713/165 |
| 6,393,412 B1 | 5/2002 | Deep | |
| 6,393,556 B1 | 5/2002 | Arora | |
| 6,405,318 B1 | 6/2002 | Rowland | |
| 6,414,635 B1 | 7/2002 | Stewart et al. | 342/457 |
| 6,446,203 B1 | 9/2002 | Aguilar et al. | |
| 6,449,716 B1 | 9/2002 | Rickey | |
| 6,477,702 B1 | 11/2002 | Yellin et al. | |
| 6,487,601 B1 | 11/2002 | Hubacher et al. | |
| 6,496,847 B1 | 12/2002 | Bugnion et al. | |
| 6,505,300 B2 | 1/2003 | Chan et al. | |
| 6,507,909 B1 | 1/2003 | Zurko et al. | |
| 6,510,418 B1 * | 1/2003 | Case et al. | 705/26.8 |
| 6,513,156 B2 | 1/2003 | Bak et al. | |
| 6,519,623 B1 | 2/2003 | Mancisidor | |
| 6,529,143 B2 | 3/2003 | Mikkola et al. | |
| 6,529,728 B1 | 3/2003 | Pfeffer et al. | |
| 6,530,024 B1 | 3/2003 | Proctor | |
| 6,539,425 B1 | 3/2003 | Stevens et al. | 709/220 |
| 6,604,089 B1 * | 8/2003 | Van Horn et al. | 705/26.2 |
| 6,609,199 B1 * | 8/2003 | DeTreville | 713/172 |
| 6,609,248 B1 | 8/2003 | Srivastava et al. | |
| 6,622,018 B1 | 9/2003 | Erekson | |
| 6,650,902 B1 | 11/2003 | Richton | |
| 6,654,800 B1 | 11/2003 | Rieger, III | |
| 6,671,716 B1 | 12/2003 | Diedrichsen et al. | |
| 6,678,827 B1 | 1/2004 | Rothermel et al. | 726/6 |
| 6,678,833 B1 | 1/2004 | Grawrock | |
| 6,681,304 B1 | 1/2004 | Vogt et al. | |
| 6,684,196 B1 * | 1/2004 | Mini et al. | 705/14.34 |
| 6,694,434 B1 | 2/2004 | McGee et al. | |
| 6,697,944 B1 * | 2/2004 | Jones et al. | 713/168 |
| 6,701,440 B1 | 3/2004 | Kim et al. | |
| 6,732,276 B1 | 5/2004 | Cofler et al. | |
| 6,751,680 B2 | 6/2004 | Langerman et al. | |
| 6,757,710 B2 | 6/2004 | Reed | |
| 6,757,824 B1 * | 6/2004 | England | 713/156 |
| 6,757,830 B1 | 6/2004 | Tarbotton et al. | |
| 6,772,331 B1 | 8/2004 | Hind et al. | 713/151 |
| 6,775,779 B1 | 8/2004 | England et al. | |
| 6,778,968 B1 * | 8/2004 | Gulati | 705/36 R |
| 6,785,015 B1 | 8/2004 | Smith et al. | |
| 6,799,270 B1 * | 9/2004 | Bull et al. | 713/153 |
| 6,837,229 B2 | 1/2005 | Mizutani | |
| 6,853,988 B1 | 2/2005 | Dickinson et al. | |
| 6,868,406 B1 * | 3/2005 | Ogg et al. | 705/60 |
| 6,889,325 B1 | 5/2005 | Sipman et al. | |
| 6,892,307 B1 | 5/2005 | Wood et al. | |
| 6,931,545 B1 | 8/2005 | Ta et al. | |
| 6,948,069 B1 | 9/2005 | Teppler | |
| 6,948,073 B2 | 9/2005 | England et al. | |
| 6,965,816 B2 | 11/2005 | Walker | |
| 6,988,250 B1 | 1/2006 | Proudler et al. | |
| 7,051,343 B2 | 5/2006 | Bracha et al. | |
| 7,058,807 B2 | 6/2006 | Grawrock et al. | |
| 7,076,655 B2 | 7/2006 | Griffin et al. | |
| 7,076,804 B2 | 7/2006 | Kershenbaum et al. | |
| 7,159,210 B2 | 1/2007 | Griffin et al. | |

| | | | |
|---|---|---|---|
| 7,181,608 B2 | 2/2007 | Fallon et al. | |
| 7,194,623 B1 | 3/2007 | Proudler et al. | |
| 7,302,698 B1 | 11/2007 | Proudler et al. | |
| 7,376,974 B2 | 5/2008 | Proudler et al. | |
| 7,457,951 B1 | 11/2008 | Proudler et al. | |
| 7,529,919 B2 | 5/2009 | Lampson et al. | |
| 7,669,238 B2 | 2/2010 | Fee et al. | |
| 7,865,876 B2 | 1/2011 | Griffin et al. | |
| 7,877,799 B2 | 1/2011 | Proudler | |
| 2001/0037450 A1 | 11/2001 | Metlitski et al. | |
| 2001/0051515 A1 | 12/2001 | Rygaard | |
| 2002/0012432 A1 | 1/2002 | England et al. | 380/231 |
| 2002/0023212 A1* | 2/2002 | Proudler | 713/164 |
| 2002/0089528 A1 | 7/2002 | Hay et al. | |
| 2002/0120575 A1 | 8/2002 | Pearson et al. | |
| 2002/0120876 A1 | 8/2002 | Pearson et al. | |
| 2002/0184488 A1 | 12/2002 | Amini et al. | |
| 2002/0184520 A1 | 12/2002 | Bush et al. | |
| 2003/0009685 A1 | 1/2003 | Choo et al. | |
| 2003/0014466 A1 | 1/2003 | Berger et al. | |
| 2003/0018892 A1 | 1/2003 | Tello | 713/164 |
| 2003/0037237 A1 | 2/2003 | Abgrall et al. | 713/166 |
| 2003/0041250 A1 | 2/2003 | Proudler | |
| 2003/0084436 A1 | 5/2003 | Berger et al. | |
| 2003/0145235 A1 | 7/2003 | Choo | |
| 2003/0191957 A1 | 10/2003 | Hypponen et al. | |
| 2003/0221124 A1 | 11/2003 | Curran et al. | |
| 2004/0073617 A1 | 4/2004 | Milliken et al. | |
| 2005/0256799 A1 | 11/2005 | Warsaw et al. | |

FOREIGN PATENT DOCUMENTS

| | | |
|---|---|---|
| EP | 0 304 033 A2 | 2/1989 |
| EP | 0421409 A2 | 4/1991 |
| EP | 0510224 A1 | 10/1992 |
| EP | 0 580 350 A1 | 1/1994 |
| EP | 0 825 511 A2 | 2/1998 |
| EP | 0 849 657 A1 | 6/1998 |
| EP | 0849680 | 6/1998 |
| EP | 0 465 016 B1 | 12/1998 |
| EP | 0893751 A1 | 1/1999 |
| EP | 0 895 148 A1 | 2/1999 |
| EP | 0926605 A1 | 6/1999 |
| EP | 0992958 A2 | 4/2000 |
| EP | 1 030 237 A1 | 8/2000 |
| EP | 1 056 014 A1 | 11/2000 |
| EP | 1049036 | 11/2000 |
| EP | 1055990 | 11/2000 |
| EP | 1056010 A1 | 11/2000 |
| EP | 1076279 A1 | 2/2001 |
| EP | 1085396 A1 | 3/2001 |
| EP | 1107137 A2 | 6/2001 |
| GB | 2317476 A | 3/1998 |
| GB | 2 336 918 | 11/1999 |
| GB | 2 353 885 A | 3/2001 |
| GB | 2361153 A | 10/2001 |
| JP | 9214493 | 8/1997 |
| JP | 10083382 | 3/1998 |
| JP | 10293704 | 10/1998 |
| JP | 10510647 | 10/1998 |
| JP | 10293705 | 11/1998 |
| JP | 11003248 | 1/1999 |
| JP | 2001-0016655 | 1/2001 |
| JP | 2001-0076655 | 1/2001 |
| WO | 93/25024 | 12/1993 |
| WO | 94/11967 | 5/1994 |
| WO | 95/24696 | 9/1995 |
| WO | 95/27249 | 10/1995 |
| WO | 97/29416 | 8/1997 |
| WO | 98/26529 | 6/1998 |
| WO | 98/36517 | 8/1998 |
| WO | PCT/US98/44402 | 8/1998 |
| WO | 98/40809 | 9/1998 |
| WO | 98/45778 | 10/1998 |
| WO | PCT/US98/15082 | 2/1999 |
| WO | 00/31644 | 6/2000 |
| WO | 00/48062 | 8/2000 |
| WO | 00/48063 | 8/2000 |
| WO | 00/54125 | 9/2000 |
| WO | 00/54126 | 9/2000 |
| WO | PCT/US00/52900 | 9/2000 |
| WO | PCT/US00/58859 | 10/2000 |
| WO | 00/73913 A1 | 12/2000 |
| WO | PCT/US00/73904 | 12/2000 |
| WO | PCT/US01/13198 | 2/2001 |
| WO | 01/23980 | 4/2001 |
| WO | PCT/US01/27722 | 4/2001 |
| WO | PCT/US01/65334 | 9/2001 |
| WO | PCT/US01/65366 | 9/2001 |

OTHER PUBLICATIONS

Bontchev, V., "Possible Virus Attacks Against Integrity Programs and How to Prevent Them," *Virus Bulletin Conference*, pp. 131-141 (Sep. 1992).

Radai, Y., "Checksumming Techniques for Anti-Viral Purposes," *Virus Bulletin Conference*, pp. 39-68 (Sep. 1991).

Intel, "Wired for Management Baseline specification v2.0," *Boot Integrity Services Application Programming Interface Version 1.0*, 64 pages (Dec. 28, 1998).

"Information technology-Security techniques-Entity Authentication—Part 3: Mechanisms using digital signature techniques," *ISO/IEC 9798-3*, 6 pages (1998).

"Information technology-Security techniques-Key management—Part 3: Mechanisms using asymmetric techniques," *ISO/IEC 11770-3*, pp. 1-23 and Annexes A-E (1999).

The Trusted Computing Platform Alliance, "Building a Foundation of Trust in the PC," 9 pages, located at Internet address <www.trustedpc.org/home/home.html> (Jan. 2000).

Trusted Computing Platform Alliance, Main Specification Version 1.0, 284 pages (Jan. 25, 2001).

U.S. Appl. No. 09/979,902, filed Nov. 27, 2001, Proudler et al.
U.S. Appl. No. 09/979,903, filed Nov. 27, 2001, Proudler et al.
U.S. Appl. No. 10/080,476, filed Feb. 22, 2002, Proudler et al.
U.S. Appl. No. 10/080,477, filed Feb. 22, 2002, Brown et al.
U.S. Appl. No. 10/080,478, filed Feb. 22, 2002, Pearson et al.
U.S. Appl. No. 10/194,831, filed Jul. 11, 2002, Chen et al.
U.S. Appl. No. 10/206,812, filed Jul. 26, 2002, Proudler.
U.S. Appl. No. 10/208,718, filed Jul. 29, 2002, Chen et al.

Anderson, R., et al., "Tamper Resistance—a Cautionary Note," *ISENIX Association, Second USENIX Workshop on Electronic Commerce*, pp. 1-11 (Nov. 18-21, 1996).

Yee, B., "Using Secure Coprocessors," Doctoral thesis—Carnegie Mellon University, pp. 1-94 (May 1994).

"Secure Computing with JAVA™: Now and the Future," Internet: <http://java.sun.com/marketing/collateral/security.html> pp. 1-29 (Apr. 2, 2002).

U.S. Appl. No. 10/080,466, filed Feb. 22, 2002, Pearson, et al.
U.S. Appl. No. 10/080,479, filed Feb. 22, 2002, Pearson, et al.
U.S. Appl. No. 10/165,840, filed Jun. 7, 2002, Dalton.
U.S. Appl. No. 10/175,185, filed Jun. 18, 2002, Pearson, et al.
U.S. Appl. No. 10/175,395, filed Jun. 18, 2002, Pearson, et al.
U.S. Appl. No. 10/240,137, filed Sep. 26, 2002, Dalton, et al.
U.S. Appl. No. 10/240,138, filed Sep. 26, 2002, Choo.
U.S. Appl. No. 10/240,139, filed Sep. 26, 2002, Choo, et al.

"Building a Foundation of Trust in the PC," Trusted Computing Platform Alliance, pp. 1-7, Jan. 2000.

"Information Technology-Security Techniques-Key Management-Part 3: Mechanisms Using Asymmetric Techniques," ISO/IEC 11770-3, pp. 1-34, 1999.

"NIST Annouces Technical Correction to Secure Hash Standard," <http://www.nist.gov/public_affairs/releases/hashstan.htm>, pp. 1-2, Oct. 24, 2002.

"Norton AntiVirus 5.0 Delux," PC Magazine Online; The 1999 Utility Guide: Desktop Antivirus, pp. 1-2, <http://www.zdnet.com/pcmag/features/utilities99/deskav07.html>, Retrived Nov. 30, 2001.

"System for Detecting Undesired Alteration of Sofware," IBM Technical Disclosure Bulletin, vol. 32, No. 11, pp. 48-50, Apr. 1990.

Anderson, R., et al, "Tamper Resistance-A Cautionary Note," ISENIX Association, Second USENIX Workshop on Electronic Commerce, pp. 1-11, Nov. 18-21, 1996.

Barkley, J., et al, "Managing Role/Permission Relationships Using Object Access Types," p. 73-80, Jul. 1998 ACM.

Berger, J. L. et al., "Compartmented Mode Workstation: Prototype Highlights'" IEEE Transactions on Software Engineering, vol. 16, No. 6, Jun. 1990.

Bontchev, V., "Possible Virus Attacks Against Integrity Programs and How to Prevent Them," Virus Bulletin Conference, pp. 131-141, Sep. 1992.

Boot Integrity Services Application Programming Interface, Version 1.0, Intel Corporation, pp. 1-60, Dec. 28, 1998.

Chaum, D., "Security Without Identification: Transaction Systems to Make Big Brother Obsolete," Communications of the ACM, vol. 28, No. 10, pp. 1030-1044, Oct. 1985.

Choo, T.H., et al., "Trusted Linux: A Secure Platform for Hosting Compartmented Applications," Enterprise Solutions, pp. 1-14 Nov.-Dec. 2001.

Dalton, C., et al., "An Operating System Approach to Securing E-Services," Communications of the ACM, vol. 44, Issue 2, Feb. 2001.

Dalton, C., et al., "Applying Military Grade Security to the Internet," Computer Networks and ISND Systems, col. 29, pp. 1799-1808, 1997.

Dalton, C., et al., "Design of Secure UNIX," Elsevier Information Security Report, Feb. 1992.

EDS Timeline, the 1960's, at EDS.com, retrieved Jun. 16, 2006.

Grimm, R., et al, "Seperating Access Control Policy, Enforcement, and Functionality in Extensible Systems," pp. 36-70, Feb. 2001, ACM.

Hallyn, S.E.,. et al., "Domain and Type Enforcement for Linux," <http://www.usenix.org/publications/library/proceedings/als2000/full_papers/hallyn/hallyn_html/>, Retrieved Apr. 24, 2002.

"HP Virtualvault: Trusted Web-Server Platform Product Brief," <http://www.hp.com/security/products/virtualvault/papers/brief_4.0/> pp. 1-6, Retrieved Apr. 24, 2002.

Intel Corporation: "Chapter 3: Protected Mode Memory Management," Intel Architecture; Software Developer's Manual, vol. 3: System Programming (Jan. 1, 1999).

Jaeger. T., et al, "Requirements of Role-Based Access Control to Prevent Piracy of Digital Inforrnation,"Proceedings of the IEEE, vol. 87, No. 7, pp. 1239-1250, Jul. 1999.

Loscocco, P., et al., "Integrating Flexible Support for Security Policies into the Linux Operating System," <www.nsa.gov/selinux>, Retrieved Apr. 24, 2002.

Milojicic, D., et al, "Process Migration," <http://www.hpl.hp.com/techreports/1999/HPL-1999-21.html.> pp. 1-48. Dec. 5, 2008.

Naor, M., et al, "Secure and Efficient Metering," <http://citeseer.nj.com/naor98secure.html> Sections 1-1.3, 1998.

Radai, Y., "Checksumming Techniques for Anti-Viral Purposes," Virus Bulletin Conference, pp. 39-68, Sep. 1991.

"Secure Computing with Java: Now and the Future," <http://java.sun.com/marketing/collateral/security.html>, pp. 1-29, Apr. 2, 2002.

"Secure Execution Environments, Internet Safety through Type-Enforcing Firewalls," <http://www.ghp.com/research/nailabs/secure-execution/internet-safety.asp>, Retrieved Apr. 24, 2002.

Senie, D., "Using the Sock_Packet mechanism in Linux to Gain Complete Control of an Ethernet Interface," <http://www.senie.com/dan/technology/sock_packet.html>, Retrieved Apr. 24, 2002.

Sophos Anti-Virus for Notes/Domino Release Notes, Version 2.0, pp. 1-2, <http://sphos.com/sophos/products/full/readmes/readnote.txt>, Retrieved Nov. 30, 2001.

The Trusted Computing Platform Alliance, "Building A Foundation of Trust in the PC," 9 pages, <www.trustedpc.org/home/home.html.> Jan. 2000.

Trusted Computing Platform Alliance (TCPA) Design Philosophies and Concepts, Version 1.0, <www.trustedpc.org>, pp. 1-30, Jan. 2001.

Wiseman, S., et al, "The Trusted Path Between SMITE and the User," Proceedings 1998 IEEE Symposium on Security and Privacy, pp. 147-155, Apr. 18-21, 1988.

Yee, B., "Using Secure Coprocessors," Doctoral Thesis-Carnegie Mellon University, pp. 1-7, Jan. 2000.

Zhang, X.N., "Secure Code Distribution," pp. 76-79, 1997 IEEE.

Ford, B., et al "Microkernels Meet Recursive Virtual Machines," Operating Systems Review, ACM, vol. 30, No. Special Issue, pp. 137-151, Dec. 21, 1996.

Goldberg, R.P., "Survey of Virtual Machine Research," IEEE Service Center, vol. 7, No. 6, pp. 34-45, Jun. 1974.

Popek, J., "Formal Requirements for Virtualizable Third Generation Architectures," Communications of the Assoc. for Computing Machinery, ACM, vol. 17, No. 7, p. 412-421, Jul. 1974.

Burke, J.P., "Security Suite Gives Sniffer Programs Hay Fever," HP Professional, vol. 8, No. 9, 3 pages total, Sep. 1994.

Schneck, P.B., "Persistent Access Control to Prevent Piracy of Digital Information," Proceedings of the IEEE, vol. 87, No. 7, pp. 1239-1250, Jul. 1999.

Spalka, A., et al, "Protecting the Creation of Digital Signatures with Trusted Computing Platform Tech . . . " Info. Security, Int'l Conf.: Proceedings ISC, Jun. 2001, p. 403-419.

"Information Technology-Security Techniques-Key Management-Part 3: Mechanisms Using Digital Signature Techniques," ISO/IEC 9798-3, 1998.

Schneier, B., et al., "Applied Cryptography, Second Edition", John Wiley and Sons, Inc. pp. 34-38.

"HP Virtualvault: Trusted Web-Server Platform Product Brief," <http://www.hp.com/security/producte/virtualvault/papers/brief_4.0/> pp. 1-6, 2001.

Schneier, B., et al, "Applied Cryptography, Second Edition", John Wiley and Sons, Inc. pp. 34-38, 1996.

Anderson, R., et al., "Tamper Resistance—a Cautionary' Note," *ISENIX Association, Second USENIX Workshop on Electronic Commerce*, pp. 1-11 (Nov. 18-21, 1996).

Naor, M., et al., "Secure and Efficient Metering," Internet: <http://citeseer.nj.com/naor98secure.html> Sections 1-1.3 (1998).

Yee, B., "Using Secure Coprocessors," Dottoral thesis.- Carnegie Mellon University, pp. 1-94 (May 1994).

"NIST Announces Technical Correction to Secure Hash Standard," Internet: <http://www.nist.gov/public_affairs/releases/hashstan.htm> pp. 1-2 (Oct. 24, 2002).

"Secure Computing with Java™: Now and the Future," Internet: <http://java.sun.com/marketing/collateral/security. html> pp. 1-29 (Apr. 2, 2002).

* cited by examiner

METHOD OF AND APPARATUS FOR ASCERTAINING THE STATUS OF A DATA PROCESSING ENVIRONMENT

CROSS REFERENCE TO RELATED APPLICATIONS

The subject matter of the present application may also be related to the following U.S. Patent Applications: "Data Event Logging in Computing Platform," Ser. No. 09/979,902, filed Nov. 27, 2001; "Data Integrity Monitoring in Trusted Computing Entity," Ser. No. 09/979,903, filed Nov. 27, 2001; "Information System," Ser. No. 10/080,476, filed Feb. 22, 2002; "Trusted Computing Environment," Ser. No. 10/080, 477, filed Feb. 22, 2002; "Method of and Apparatus for Investigating Transactions in a Data Processing Environment," Ser. No. 10/080,478, filed Feb. 22, 2002; "Trusted Platform Evaluation," Ser. No. 10/194,831, filed Jul. 11, 2002; "Privacy of Data on a Computer Platform," Ser. No. 10/206,812, filed Jul. 26, 2002; and "Method and Apparatus for Locking an Application Within a Trusted Environment," Ser. No. 10/208,718, filed Jul. 29, 2002.

TECHNICAL FIELD

The present invention relates to a method of and apparatus for determining status of a data processing environment. The information concerning the status of the environment may include an indication of what devices are operating within the environment, what facilities they offer and whether the devices can be trusted.

BACKGROUND ART

The issues of security and ease of use of a computing platform are often in conflict. For commercial applications, a client computing platform typically operates in an environment where its behaviour is vulnerable to modification. Such modification can be made by local or remote entities. This has given rise to concerns, especially in the field of e-commerce, that transactions conducted on a computer might be subject to some form of misdemeanour, such as theft of credit card details. These perceived insecurities may limit the willingness of users to undertake e-commerce transactions on either local or remote computer systems.

The data processing environment (or environment) of a computer platform or other data processing appliance consists of the other computing entities (computer platforms or any other data processing appliance) that are discrete from the computer platform and are in communication with it through one or more data networks. For a computer entity to form part of the environment of a computer platform, the computer platform must be able to interact with the entity but must not be constrained to do so—at some level, interaction must be voluntary. The boundary of an environment will generally be considered in terms of network connections (or other network "distance") between one point and another—for some purposes, the data processing environment of a computer platform may be considered its local network and no more, whereas for other purposes, the data processing environment of a computer platform may extend much further (for example, across a company intranet). There are existing security applications, such as virus checkers and fire walls which can be installed in computer systems in order to limit their vulnerability to viruses or to malicious users seeking to take control of the machine remotely. However, these security applications execute on computing platforms under the assumption that the platform is operating as intended and that the platform itself will not subvert the processes used by these applications.

Users engaging in communication with a remote or unfamiliar data processing environment may nevertheless be concerned about the security of that environment as a whole rather than just the security of the computing device with which they have made initial contact. Thus users seek reassurance that the computing environment can be trusted.

As used herein, the word "trust" is used to mean that something can be trusted, in the sense that it is working in the way that it is intended and expected to work and is not or has not been tampered with in order to run malicious operations.

DISCLOSURE OF THE INVENTION

According to a first aspect of the present invention, there is provided an apparatus for ascertaining the status of a data processing environment, comprising at least one trusted computing device which is arranged to challenge other devices within a data processing environment, to keep a record of the responses and to make the record available.

It is thus possible to use a trusted computing device to keep an audit of the status of a data processing network. The trusted device can challenge new devices as and when it discovers them within the data processing environment and can also re-challenge known devices every now and again in order to ascertain that they are functioning correctly. In such a challenge, a trusted computing device extracts from the challenged device a response to the challenge. Preferably the challenged device enters into a predefined challenge—response protocol, such as a TCPA challenge—response protocol in order to return trusted integrity and identity information about the challenged device. Thus the response may include information which can be analysed to determine the integrity of the challenged device, such as at least one integrity metric. The trusted device, upon receiving the response, extracts the integrity information from the response and compares it with an authenticated metric for the challenged device. As a result of the comparison, the trusted device can indicate whether the challenged device can be trusted or not. By keeping a record of the time that a device is challenged, the response received from the device and the result of the comparison of the integrity metrics, the trusted computing device can maintain a log of the status of the data processing environment.

The integrity information would normally include a cryptographic representation of at least one platform component. This may, for example, include the BIOS, operating system or an application. Preferably the integrity information is of the form described in the TCPA specification (www.trustedpc.org) and has been measured and stored in the form described in the TCPA specification.

Advantageously other devices within the data processing environment can also issue challenges. The responses to those challenges and conclusions concerning trustworthiness can be recorded by the at least one trusted computing device. An indication of which devices acted as challenger and challengee can also be recorded, together with an indication of whether the challenger is itself established as trustworthy.

Preferably the challenges to known devices are made on a periodic basis in order to maintain an up to date record of the integrity of the data processing environment. However, additional challenges may also be made when a device attempts to perform an operation within the environment which requires that device to be trusted. Thus attempts to read, create or modify sensitive data, whether this data be user data, application data or system data (as defined by a system administrator) may require re-authentication of the trustworthiness of the device before it is enabled to have such access.

Advantageously the record held by the trusted device includes historical data representing the status of the network. Such data may be of use during investigations of system performance in order to indicate when a data processing environment could be regarded as trustworthy and/or what devices or processes may have entered or been executed in that environment. This information may be of use to administrators or investigators when seeking data concerning fraudulent transactions or attempts to subvert the operation of one or more components within the system.

In order to maintain a record of the devices within the computing environment, the trusted computing device needs to ascertain what devices are there. It can do this by sending query messages into the environment. The queries may be specific, that is directed to a known device in order to ascertain that it is still there and functioning. However, the queries may also be more general. Thus, for example, the trusted computing device could issue a query to a class of devices, for example printers, to identify what printers are available within the data processing environment. Such a query could then be repeated for a different class of device in order to build up a picture of the data processing environment. Alternatively, the trusted computing device could issue a general query asking devices to respond by identifying themselves, and optionally their functionality and/or integrity metrics. Advantageously the query also includes a generation identifier such that the age of the query can be ascertained by devices receiving the query. In this context, age can be measured in either or both the temporal sense or the number of retransmissions that the message has undergone. It is particularly desirable to limit the number of retransmissions that the query message may undergo as in extreme cases the message could propagate out of a local computing environment via, for example, a communications link to the internet and then computing devices receiving that query message could then attempt to respond. If this were the case, the trusted computing device could be overwhelmed by responses from computers which do not really constitute part of the data processing environment but which nevertheless have managed to receive the query message.

The trusted computing device can also listen to data communications on a network or between devices local to it in order to ascertain what devices are operating. The need to listen for devices entering and leaving the data processing network is likely to become more prevalent with the general increase in the number of portable computing devices and the ease at which these can enter or leave data processing environments as a result of the increase in wireless communication links to join computing devices, for example Blue Tooth.

When a user with a portable computing device or a remote user using a telecommunications link wishes to interact with a data processing environment, the user may seek to challenge the integrity of that environment. The functionality of the user's computing device and/or the communications bandwidth between the user's device and the data processing network may limit the ability of the user to make individual challenges to each device in the data processing environment. However, the user may still seek confirmation that the data processing environment is secure, or at least an indication of the trust which he should place in that data processing environment (for a user may still decide to use a data processing environment even if that data processing environment is not deemed to be trustworthy—this is the user's choice depending on the type of transaction that the user wishes to undertake and the urgency ascribed to that transaction). With the present invention, a user does not need to make individual challenges to each device, but instead can seek this data from the trusted computing device. The user can trust the data from the trusted computing device because the user can challenge the trusted computing device and analyse the response to the challenge, comparing the integrity metrics received from the trusted computing device with those which are certificated as being the correct metrics, thereby enabling the user to determine whether the trusted computing device is itself trustworthy. The user can also determine what facilities are available in the computing environment.

According to a second aspect of the present invention, there is provided a computing device including a communications device and a data processor wherein the data processor is arranged to establish communication with a trusted computing device via the communication device, to receive at least part of the record of responses and to establish from an internal rules base whether the data processing environment is trustworthy enough to enable a class of transaction or task to be carried out in that environment.

According to a third aspect of the present invention, there is provided a computing device including a communications device and a data processor, wherein the computing device uses the communication device to establish communication with at least one device within a data processing system, and in which the data processor is arranged to identify challenges from at least one trusted computing device, to apply response rules to the challenge and, if a response is indicated, to respond to the challenge in accordance with the rules.

Advantageously, when the computing device receives a challenge from the trusted device it examines a generation identifier in order to see whether the message is still valid. The generation identifier may be a skip number. Thus, each time the challenge is retransmitted the skip number is modified, and every time a device receives a challenge, it checks the skip number to see if the challenge is valid. For convenience, the trusted computing device may set the skip number to an integer value greater than zero, and the skip number may be decremented at each retransmission. Any device receiving a challenge with a skip number of zero ignores the challenge and does not retransmit the challenge. This prevents the challenge from propagating too widely.

According to a fourth aspect of the present invention, there is provided a method of ascertaining the status of the data processing environment, the method comprising the steps of using a trusted computing device to challenge other devices within a data processing environment, keeping a record of the responses made to the challenges and making the record available.

Preferably the trusted computing device will itself respond to a challenge such that the integrity of the trusted computing device can be verified by the device which challenged it.

According to a further aspect of the present invention, there is provided a method of conducting a transaction in a data processing environment comprising a user device and at least a trusted computing device each having respective communications capabilities, wherein the trusted computing device keeps a record of computing devices that it has identified within the data processing environment, and wherein the user device is arranged to establish communications with the trusted computing device, to receive therefrom at least a portion of the record of computing devices within the data processing environment, and to analyse the record to establish what facilities the user device may access.

Preferably the user device further analyses the record in accordance with a set of security rules contained therein to determine what level of trust the user device can place on the integrity of the data processing environment.

It is thus possible to provide a trusted record of the status and trustworthiness of devices within a data processing network such that a computing device can be spared the task of challenging each device in the computer network in order to ascertain its trustworthiness, but instead can obtain a record of the challenges from a trusted computing device.

BRIEF DESCRIPTION OF THE DRAWINGS

The present invention will further be described, by way of example, with reference to the accompanying drawings, in which.

BEST MODE FOR CARRYING OUT THE INVENTION

Many of the concepts underlying trusted computing have already been published. In particular, a specification concerning the functionality of a trusted computing environment has been published by the "trusted computing platform alliance" on their web site at www.trustedpc.org. A trusted computing device of this general type is described in the applicant's co-pending International Patent Application Publication No. PCT/GB00/00528 entitled "Trusted Computing Platform", filed on 15 Feb. 2000, the contents of which are incorporated by reference herein.

In essence, it is desirable to ensure that a computer is trustworthy. In broad terms, this can be achieved by attaching to or embedding in a computer a trusted physical device whose function in relation to that computer is to obtain measurements of data from the computer which provides an integrity metric of the computer platform. The identity of the computing platform and the integrity metric are compared with expected values that are provided by a trusted party whose role it is to vouch for the trustworthiness of the platform. If the identities and metrics match, then there is a strong implication that the platform is operating correctly. The trusted physical device is normally provided as a tamper evident component such that attempts to interfere with its operation will result in its performance being modified when it is next used.

Figure 1:
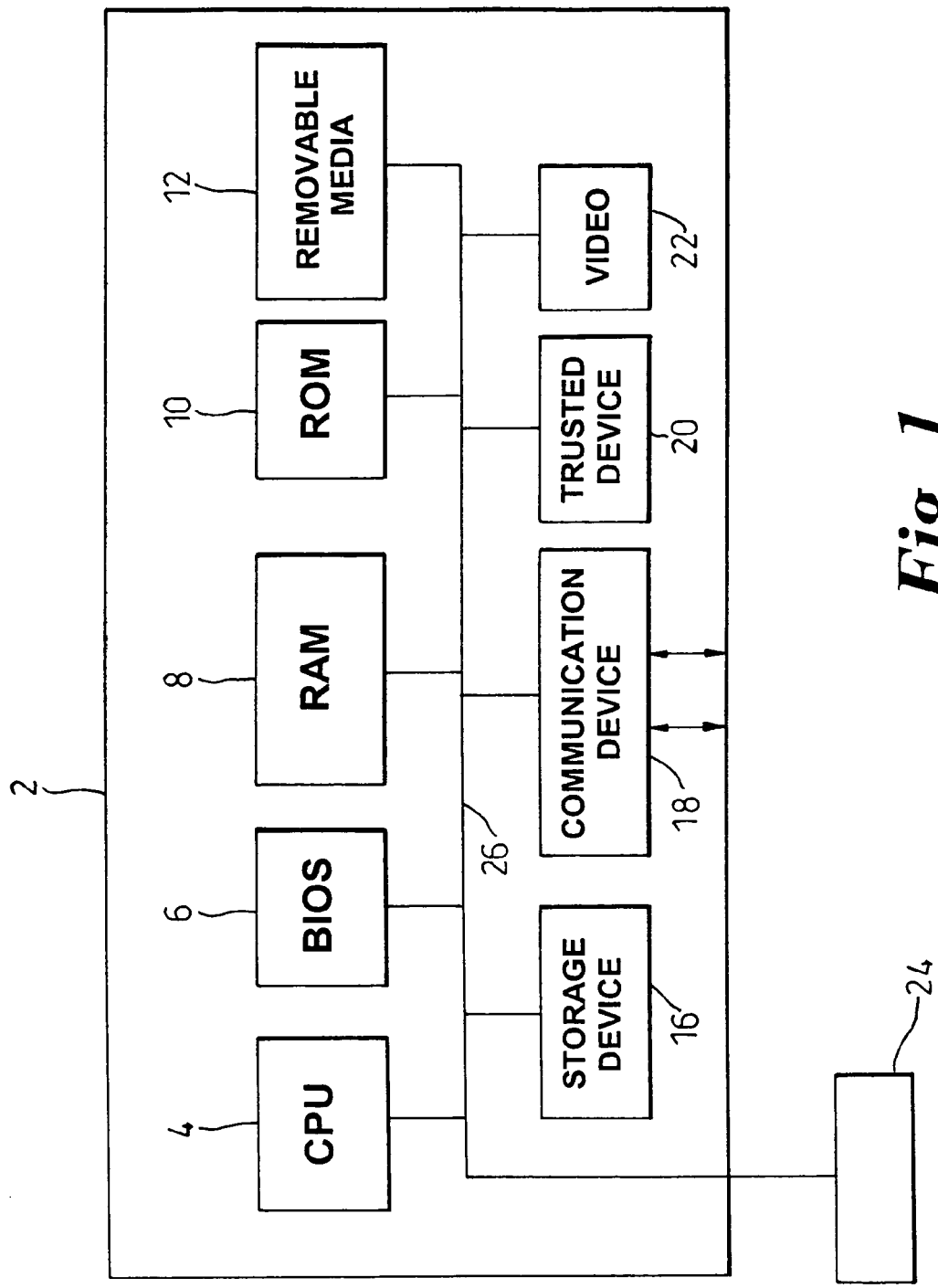
FIG. 1 is a schematic diagram illustrating the functional components within a trusted computing device.

A trusted platform is illustrated in FIG. 1. The platform 2 includes a central processing unit 4, which is in communication with BIOS memory 6, Random Access Memory 8, Read Only Memory 10, a removable data storage device 12, an internal mass storage device 16, at least one communications device 18, a trusted device 20, a video board and associated display 22, and a user input device such as a keyboard 24, via a data bus 26. In a conventional computing device, at power up or reset the CPU initially reads instructions from the BIOS 6. In the early days of computing the BIOS memory which is non-volatile was hard wired and therefore it was not possible to modify its contents. However, with the development of EEPROM it has become possible to modify the BIOS of a computer system. In a trusted computing environment, the boot-up sequence is modified such that the CPU first looks to the trusted device 20 for instructions after reset or power-up. The trusted device 20, having gained initial control of the CPU, then enables the CPU to execute the BIOS program held in the BIOS memory 6. The trusted device can investigate integrity metrics in the BIOS program, such as check sums for the whole or specific part of the BIOS or data at specific addresses in order to determine that the BIOS has not been interfered with or modified. It can compare these values against values certified as being correct by the trusted party. The BIOS 6 may advantageously be contained within the trusted device, thereby ensuring that the BIOS builds the correct environment for the operating system. The trusted device can also, through its interaction with the BIOS, enforce the operation of various security policies. After the BIOS has been loaded, the CPU can then seek to load its operating system from the storage device 16. Once again, the trusted device 20 can challenge the operating system to extract integrity metrics from it and to compare these with metrics provided by the trusted party. Thus, as the system builds up from power-up or reboot the BIOS is first confirmed as trustworthy, and once this has been established tests are made to see that the operating system is trustworthy, and once this has been established further tests may be made to ensure that applications executing on the trusted computer platform are also trustworthy. The trusted computing platform need not be a general purpose PC wherein applications are loaded from the mass storage device 16 to the random access memory 8, and indeed the trusted device could be an embedded system. In which case, it is likely that application data may also be held in read-only memory 10. The trusted computing device may have a reader 12 for removable media, such as floppy discs, or for interfacing with the smart cards which may be used to help authenticate the identity of a local user who seeks to operate the trusted computing device 2 via its keyboard 24. An interface to the local user is provided via the keyboard 24 and the video display 22, as is well known. The trusted computing device 2 also has a communications device 18 which may support one or more of direct connection with a local area or wide area network, wireless communications, infrared or ultrasonic communication and/or communications with a telecommunication network via a data link.

Figure 2:
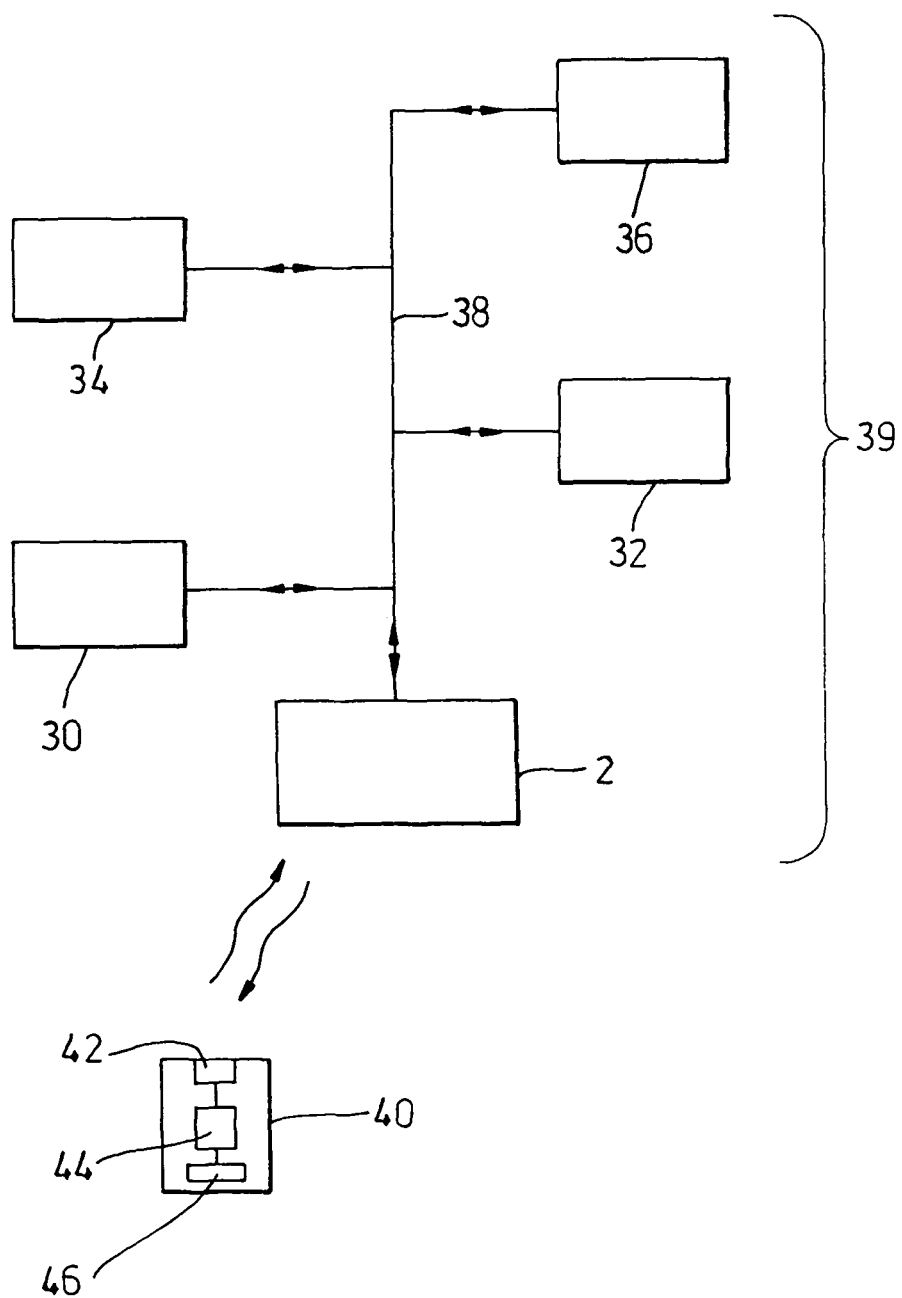
FIG. 2 schematically illustrates the structure of a first data processing environment including a trusted computing device.

As shown in FIG. 2, the trusted computing device 2 can be a component within a relatively well defined network. Thus other devices such as a printer 30, a scanner 32, and user devices 34 and 36. Each device is connected via a local area network 38. In this environment, the communications medium between devices is well defined and a number of devices on the network can be expected to change only relatively slowly.

A user's device 40, for example in the form of a personal digital assistant can establish communications with the trusted computing device 2 via the communications device 18 of the trusted computing device 2 and also a communications port 42 of the personal digital assistant. The personal digital assistant 40 also includes a central processing unit 44 and a memory 46 holding a set of security rules which the processor 44 uses to decide whether or not it should regard the data processing environment as trustworthy or not.

In use, the trusted computing device 2 challenges the devices 30 to 36 in its computing environment 38 and keeps a record of their responses, including integrity metrics, which enables it to work out whether the devices 30 to 36 can be trusted, that is that they are behaving in an expected manner and have not been subverted by external or malicious processes. The trusted device 2 keeps a record of the results of the challenges in its memory 8 and on the mass storage device 16 (see FIG. 1).

When the user's device wishes to use the facilities available of the computing network 39, it establishes communication with the trusted computing device 2, and challenges it in order to assure itself that the trusted computing device is a trusted computing device and not some rogue device masquerading or spoofing as a trusted computing device. Once the user device 40 has completed the challenge and compared the integrity metric retrieved from the trusted computing device with an expected integrity metric as certified with a trusted authority, the user device 40 may then query the trusted computing device 2 in order to obtain a list of the devices available in the local computing area, the functions that they can perform and whether or not they are trustworthy. Having received this data, the user device 40 then applies the security rules held in the memory 46 in order to determine whether, in accordance with those rules which themselves are defined either by the device owner, administrator or some other person given the rights to modify those rules, whether the local computing environment is trustworthy. If so, the user is informed. Alternatively, the user may be informed if the computing environment is not trustworthy. The user may also be informed which classes of transactions should or should not be undertaken in this environment.

Figure 3:
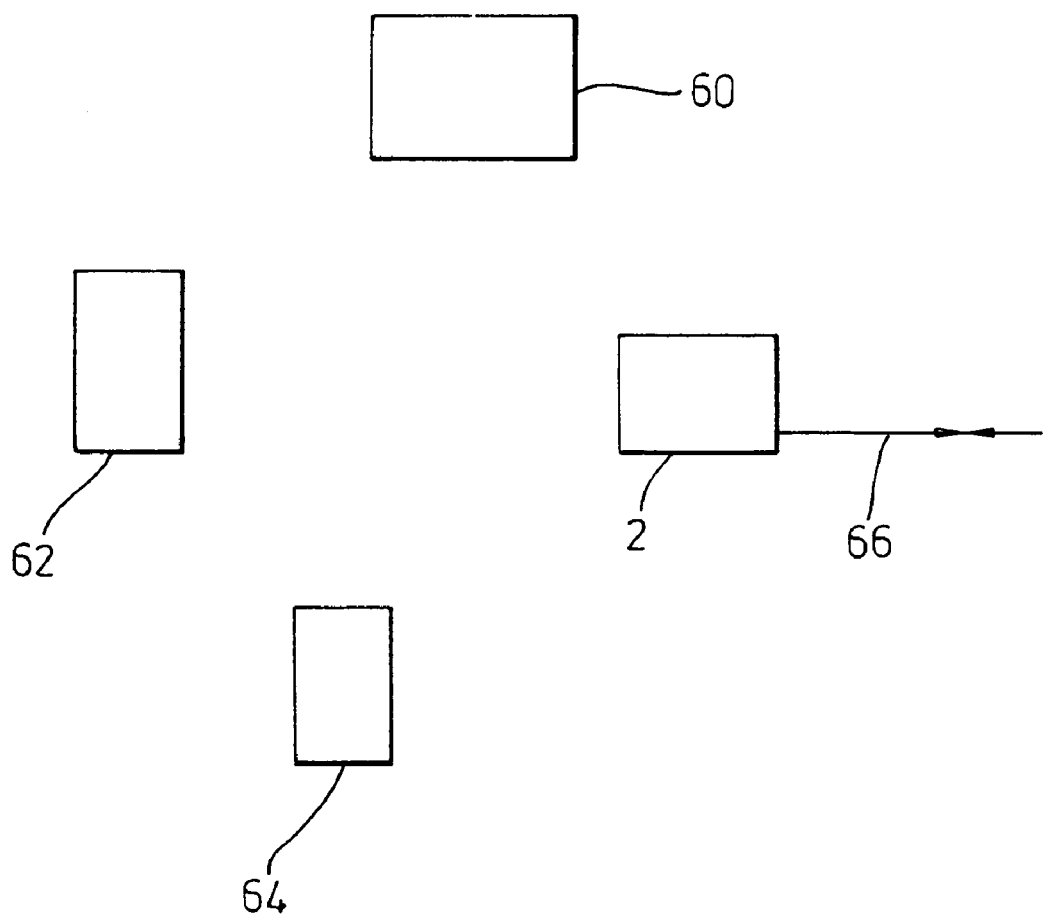
FIG. 3 schematically illustrates a second data processing environment including a trusted computing device.

Not all computing environments are as well defined as that shown in FIG. 2. Companies may wish to offer computing facilities in publicly accessible environments where it can be expected that most users will establish local wireless communications with some form of gateway or server whilst they are in the environment. Thus, as shown in FIG. 3 a trusted computing device 2 may be situated in an environment with a display device 60. Users 62 and 64 having portable computing devices such as personal digital assistants or palm top computers may enter the computing area around the devices 2 and 60 and may establish wireless communications with the trusted computing device 2 in order to enquire what facilities are available in the computing area. The computing device 2 may then inform the devices 62 and 64 about the existence of the display device 60 such that these devices can then interface with it for example to display data which they are not capable of displaying on their own inbuilt display devices. The trusted computing device 2 may also seek to inform each mobile device 62 and 64 about the presence of the other. The trusted computing device may also provide details about access to a telecommunications network 66.

Figure 4:
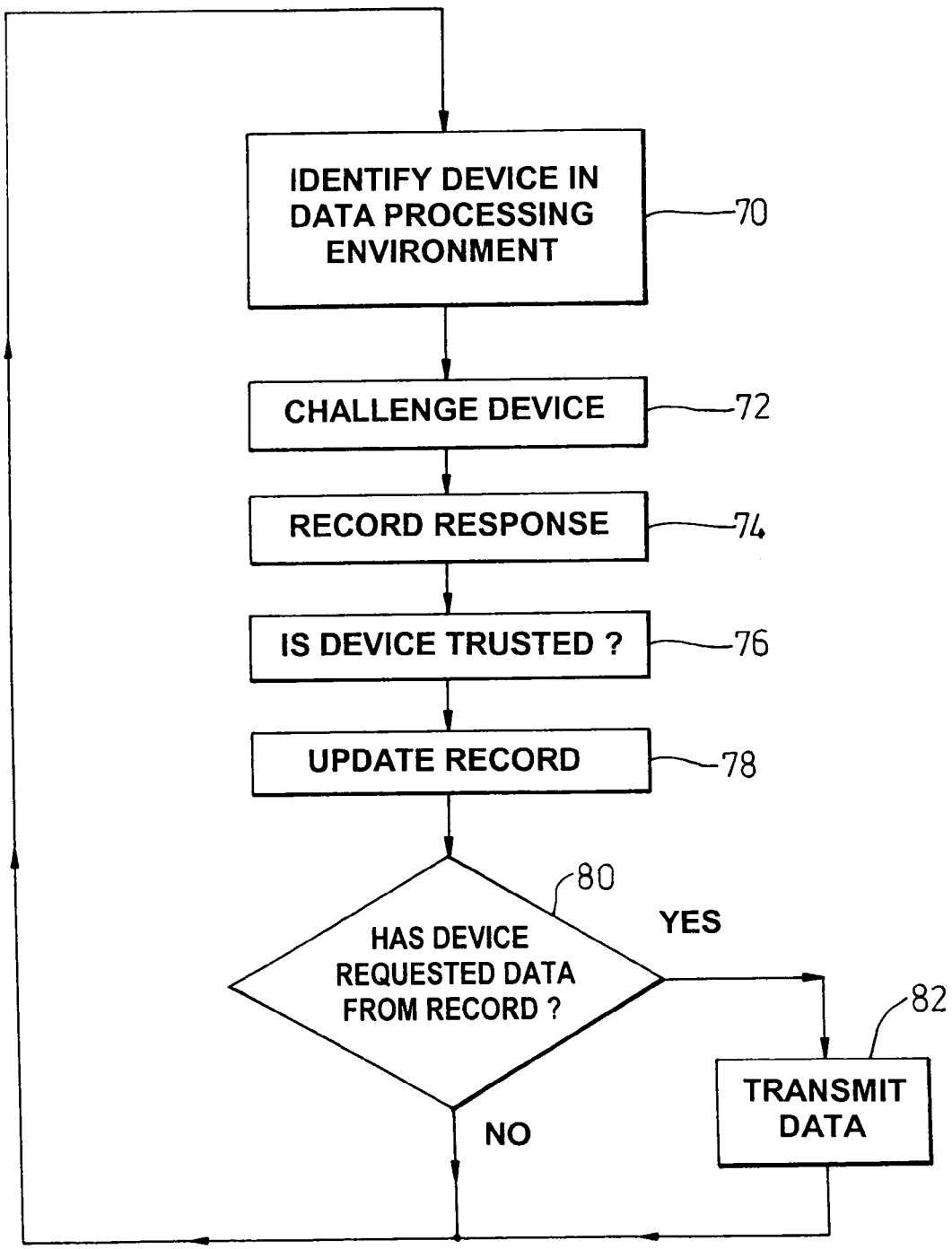
FIG. 4 is a flow chart illustrating the steps undertaken by a trusted computing device in order to maintain a record of the local data processing environment.

As indicated above, the arrangements of FIGS. 2 and 3 are simply examples of (relatively simple) data processing environments. Far more complex arrangements involving multiple network connections may nonetheless be considered data processing environments. In most practical cases, it will be necessary to define a boundary or a way to determine the extent of the environment, but this will generally not be problematic to the person skilled in the art (for example, such a boundary may be formed by a firewall). FIG. 4 schematically illustrates a sequence by which the trusted computing device 2 can maintain its record of devices in the data processing environment. Starting at step 70, the trusted computing device 2 listens to data traffic in the computing environment to identify the presence of any new devices. Once the device has been identified, control is passed to step 72 where the trusted computing devices issues a challenge to the new device. Any response made by that device is recorded at step 74, together with the time at which the response was received and then control is passed to step 76 where an analysis of any integrity metric returned by the challenged device is made in order to ascertain whether the device is trustworthy. The result of the analysis is recorded at step 78. The challenged device, or indeed any other device on the network may issue a request to the trusted device to seek information from the record, a test for any such request is made at step 80. If a request has been received, that data is transmitted at step 82, otherwise control is returned to step 70 where the integrity check can be repeated.

The status of the computing environment can be held by the trusted computing device, and consequently displayed by the user devices, in any manner convenient and appropriate for retaining such data. The status information may be provided in the form of a list of computing entities within the computing environment, together with a trust status for each of the computing entities. Most simply, these statuses could be "trusted" (indicating that the computing entity concerned is verified to have the status of a trusted computing device) or "untrusted" (where no such verification has occurred). The "untrusted" status could be broken down further into "not trusted" (where verification has failed) and "untested" (where verification has either not yet occurred or has not taken place sufficiently recently). A further possibility is for there to be multiple levels of trust available for a computing entity, such that the computing entity is able or permitted to perform different functions at the different levels of trust—more and different integrity metrics may be required to determine that a computing entity is at a higher trust level. Such an arrangement is further described in the applicant's copending International Patent Application Publication No. WO 01/27722, the contents of which are incorporated by reference to the fullest extent permitted by law. In this case, the trusted device 2 should be adapted to determine when these different trust levels are attained, and to indicate these trust levels appropriately when indicating the status of the computing environment.

Figure 5:
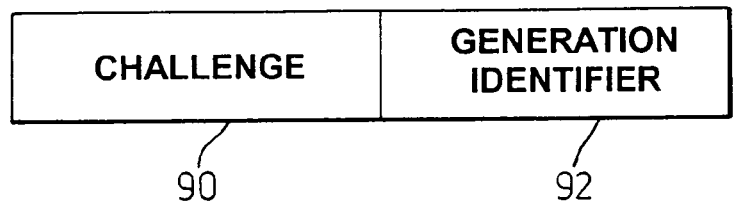
FIG. 5 illustrates the data layout of the challenge issued by the trusted computing device.

In a modification of the flow chart showing in FIG. 4, steps 70 and 72 may be replaced by a single broadcast challenge. Such a broadcast challenge is schematically shown in FIG. 5. The broadcast challenge comprises two parts, the first being the challenge message 90 and the second part being a generation identifier 92.

Figure 6:
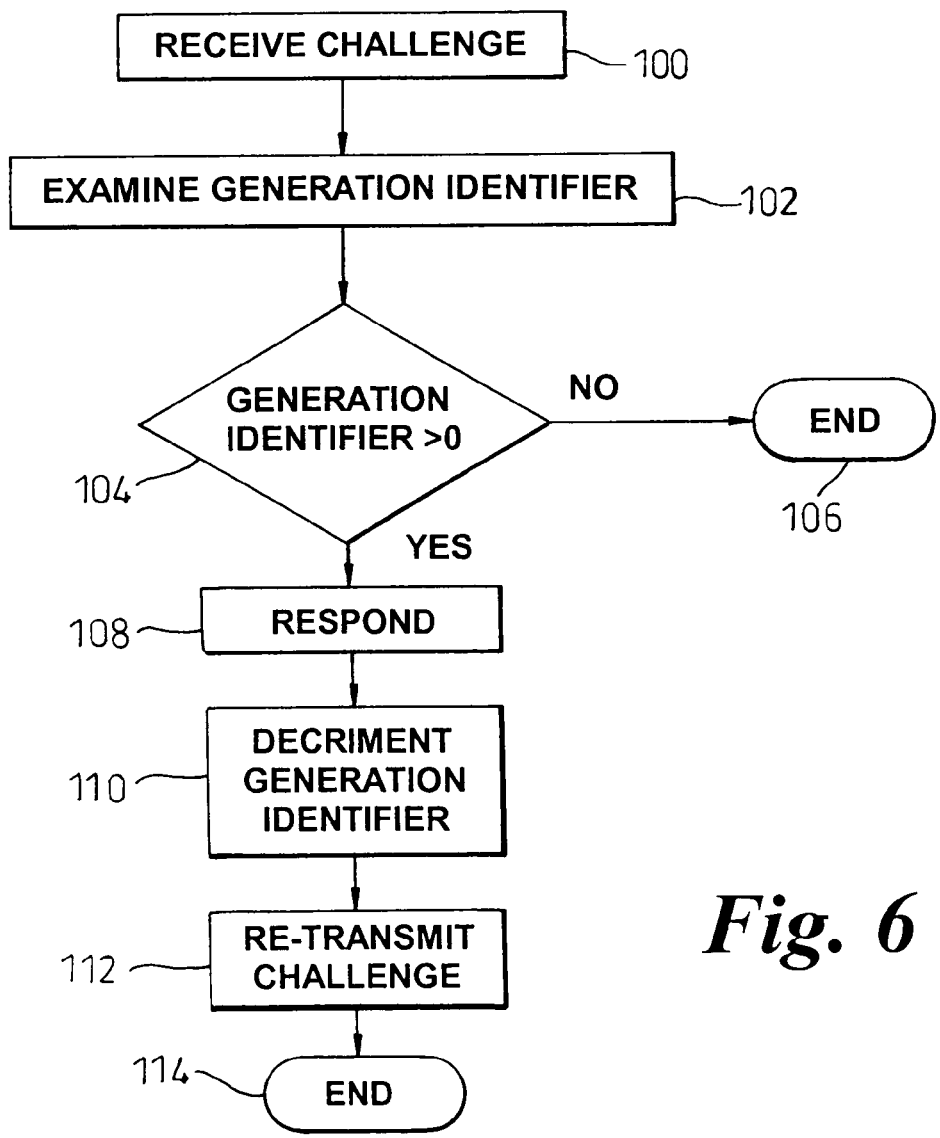
FIG. 6 is a flow chart illustrating the response of a device in the data processing environment upon receiving a challenge.

Devices receiving the challenge shown in FIG. 5 may execute the procedure shown in FIG. 6. The procedure starts at step 100 where the device receives the challenge. Control is then passed to step 102 where the generation identifier is examined. In a preferred embodiment of the invention, the generation identifier is set to a positive integer number which controls the number of retransmissions which the challenge may undergo. Each time the challenge is retransmitted, the generation identifier is decremented by the device that retransmits the challenge. Thus, once the generation identifier reaches zero the challenge has become "old" and is no longer valid. At step 104 a test is made to see if the generation identifier is greater than zero, if not, control is passed to step 106 where the challenge handling routine is terminated. If the generation identifier is greater than zero control is passed to step 108 where, if the device is programmed to participate in these challenges, it responds to the challenge. From step 108 control is passed to step 110 where the challenge identifier is decremented and then to step 112 where the challenge is retransmitted with the decremented generation identifier. Control is then passed to step 114 which represents the end of this routine.

It is thus possible to provide a measure of the integrity and facilities available within a local, and possibly varying data processing network.

We claim:

1. a. A computing device including: a communication device and a data processor, wherein the computing device uses the communication device to establish communication with at least one device within a data processing system, and in which the data processor is arranged to identify a challenge from at least one trusted computing device to search for a generation identifier within the challenge, to apply response rules to the generation identifier to see if the challenge is still valid, and if it is not to disregard the challenge and if the challenge is valid to apply response rules to the challenge and, if a response indicated, to respond to the challenge in accordance with the rules.

2. A computing device as claimed in claim 1, in which the computing device retransmits the challenge with a modified generation identifier if the challenge is valid.

3. A method of ascertaining the status of a data processing environment, comprising the following steps:

a trusted computing device challenges other devices within a data processing environment, keeps a record of responses made to the challenges and makes the record available, in which a challenge of the challenges generated by the trusted device includes a generation identifier such that any device receiving the challenge can examine the generation identifier in order to establish whether the challenge is directly received from the trusted computing device or whether it has been retransmitted.

4. A method as claimed in claim 3, in which the trusted computing continues to challenge the devices in the data processing environment so as to maintain an evolving record of the status of the data processing environment.

5. A method as claimed in claim 3, in which the record includes a historical status of the data processing environment.

6. A method as claimed in claim 3, in which the at least one trusted computing device listens to communications within the data processing environment so as to identify the presence of new devices.

7. a. A method of conducting a transaction in a data processing environment comprising a user device and al least a trusted computing device each having respective communication capabilities comprising: the trusted computing device keeps a record of computing devices that it has identified within the data processing environment;

b. and whereby the user device establishes communication with the trusted computing device;

c. the trusted computing devices sends to the user device at least a portion of the record of computing devices within the data processing environment;

d. and the user device analyses the record to establish what facilities the user device may access;

e. wherein the user device further analyses the record in accordance with a set of security rules to determine what level of trust can be placed on the integrity of the data processing environment.

* * * * *

UNITED STATES PATENT AND TRADEMARK OFFICE
CERTIFICATE OF CORRECTION

| | | |
|---|---|---|
| PATENT NO. | : 8,219,496 B2 | Page 1 of 1 |
| APPLICATION NO. | : 10/080479 | |
| DATED | : July 10, 2012 | |
| INVENTOR(S) | : Siani Lynne Pearson et al. | |

It is certified that error appears in the above-identified patent and that said Letters Patent is hereby corrected as shown below:

In column 9, line 9, in Claim 1, delete "to" and insert -- to: --, therefor.

In column 9, line 11, in Claim 1, delete "challenge," and insert -- challenge; --, therefor.

In column 10, line 13, in Claim 7, delete "al least" and insert -- at least --, therefor.

In column 10, line 20, in Claim 7, delete "devices" and insert -- device --, therefor.

Signed and Sealed this
Twelfth Day of March, 2013

Teresa Stanek Rea
*Acting Director of the United States Patent and Trademark Office*